US009152446B2

(12) United States Patent
Ansel

(10) Patent No.: US 9,152,446 B2
(45) Date of Patent: *Oct. 6, 2015

(54) SYSTEM AND METHOD FOR ON-DEMAND CLONING OF VIRTUAL MACHINES

(71) Applicant: Transcontinental Events, LLC, Seattle, WA (US)

(72) Inventor: Duane A. Ansel, Seattle, WA (US)

(73) Assignee: TRANSCONTINENTAL EVENTS, LLC, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/477,627

(22) Filed: Sep. 4, 2014

(65) Prior Publication Data

US 2014/0380312 A1 Dec. 25, 2014

Related U.S. Application Data

(63) Continuation of application No. 13/886,105, filed on May 2, 2013, which is a continuation of application No. 10/948,381, filed on Sep. 23, 2004, now Pat. No. 8,464,250.

(51) Int. Cl.
G06F 9/455 (2006.01)
G06F 9/46 (2006.01)
G06F 21/31 (2013.01)
G06F 21/53 (2013.01)
H04L 29/08 (2006.01)
G06F 9/50 (2006.01)

(52) U.S. Cl.
CPC ........ G06F 9/45533 (2013.01); G06F 9/45504 (2013.01); G06F 21/31 (2013.01); G06F 21/53 (2013.01); H04L 67/02 (2013.01); G06F 9/5077 (2013.01); G06F 2009/4557 (2013.01)

(58) Field of Classification Search
None
See application file for complete search history.

(56) References Cited

U.S. PATENT DOCUMENTS

| | | | |
|---|---|---|---|
| 6,353,923 B1 | 3/2002 | Bogle et al. | |
| 6,412,070 B1 | 6/2002 | Van Dyke et al. | |
| 6,463,352 B1 | 10/2002 | Tadokoro et al. | |
| 6,622,170 B1* | 9/2003 | Harrison et al. | 709/221 |
| 6,842,777 B1 | 1/2005 | Tuli | |
| 6,854,115 B1* | 2/2005 | Traversat et al. | 718/1 |
| 7,080,378 B1 | 7/2006 | Noland et al. | |
| 7,093,086 B1 | 8/2006 | van Rietschote | |
| 7,191,441 B2 | 3/2007 | Abbott et al. | |
| 7,246,174 B2 | 7/2007 | Sciandra et al. | |

(Continued)

OTHER PUBLICATIONS

Microsoft® Virtual Server 2005 White Paper, Product Overview, Microsoft Corporation, May 2004, 14 pgs.*
Oppliger ("Microsoft.NET passport: A security analysis", IEEE, Jul. 2003, pp. 29-35).*
VMware (VMware virtual center user's manual 1.0, Mar. 2004, pp. 1-360).*

(Continued)

Primary Examiner — Abdullah Al Kawsar
Assistant Examiner — Caroline H Arcos
(74) Attorney, Agent, or Firm — Kory D. Christensen; Stoel Rives LLP

(57) ABSTRACT

A system for on-demand cloning of virtual machines (VMs) includes a virtual server to host a number of VMs, the virtual server including at least one master VM. The system also includes a Web server to authenticate a user in response to a request for online access to a new VM on the virtual server. In addition, the system includes a cloning module, in communication with the Web server and the virtual server, to automatically clone the master VM to create a unique VM clone for the user on the virtual server responsive to the request.

25 Claims, 13 Drawing Sheets

(56) References Cited

U.S. PATENT DOCUMENTS

| | | |
|---|---|---|
| 7,257,811 B2 | 8/2007 | Hunt et al. |
| 7,299,468 B2 | 11/2007 | Casey et al. |
| 7,356,679 B1 | 4/2008 | Le et al. |
| 7,428,636 B1 | 9/2008 | Waldspurger et al. |
| 7,577,722 B1 | 8/2009 | Khandekar et al. |
| 7,784,088 B2 | 8/2010 | Darbha et al. |
| 7,810,092 B1 | 10/2010 | van Rietschote et al. |
| 8,464,250 B1 | 6/2013 | Ansel |
| 2002/0069369 A1 | 6/2002 | Tremain |
| 2002/0095396 A1* | 7/2002 | Frerking et al. ............ 707/1 |
| 2003/0033344 A1 | 2/2003 | Abbott et al. |
| 2003/0088604 A1 | 5/2003 | Kuck et al. |
| 2004/0068731 A1 | 4/2004 | Davis et al. |
| 2004/0221290 A1 | 11/2004 | Casey et al. |
| 2004/0230970 A1 | 11/2004 | Janzen |
| 2005/0022184 A1 | 1/2005 | Birkestrand et al. |
| 2005/0081210 A1 | 4/2005 | Day et al. |
| 2005/0246453 A1 | 11/2005 | Erlingsson et al. |
| 2007/0214456 A1 | 9/2007 | Casey et al. |
| 2013/0290958 A1 | 10/2013 | Ansel |

OTHER PUBLICATIONS

Ben Waldron ("program customized testing environment without trashing your machine", MSDN magazine, Aug. 2004, pp. 1-7).*

IBM Trivoli Access Manager "Plug-in for web servers user's guide" version 39, fifth edition, Apr. 2002, pp. 1-138).*

Office Action from USPTO for U.S. Appl. No. 10/948,381, mailed Jun. 9, 2009.

Office Action from USPTO for U.S. Appl. No. 10/948,381, mailed Dec. 7, 2009.

Office Action from USPTO for U.S. Appl. No. 10/948,381, mailed Jan. 18, 2011.

Office Action from USPTO for U.S. Appl. No. 10/948,381, mailed Jun. 7, 2011.

Office Action from USPTO for U.S. Appl. No. 10/948,381, mailed Mar. 27, 2012.

Office Action from USPTO for U.S. Appl. No. 10/948,381, mailed Aug. 13, 2012.

Office Action from USPTO for U.S. Appl. No. 13/886,105, mailed May 21, 2015.

* cited by examiner

SYSTEM AND METHOD FOR ON-DEMAND CLONING OF VIRTUAL MACHINES

TECHNICAL FIELD

The present invention relates to digital computing and in particular relates to improved delivery of computing resources to remote users so as to minimize the burdens and inconvenience imposed on such users.

BACKGROUND OF THE INVENTION

Personal computers "PCs" are now ubiquitous, at least in developed countries. PCs come in various form factors, including desktop models, towers, laptops, handheld devices, tablet PCs, etc. As such, the term PC or personal computer is used herein in a very broad sense, and is intended to include a wide variety of computing devices, including but not limited to the kinds just mentioned. By contrast, the term PC, as used herein, would probably not include so-called mainframe computers or other systems or clusters intended to service large numbers, e.g., thousands, of simultaneous users or tasks.

PCs, of which there are now millions in use, can be found in homes and businesses large and small. Since the advent of the PC, somewhere around 1980, they have become dramatically smaller, faster, and cheaper. For most applications, software now provides graphical user interfaces (GUIs) that enable even unsophisticated users to accomplish substantial computing tasks. That being said, using, maintaining and upgrading a modern PC is challenging for most users. In the corporate environment, many companies are large enough to afford an "IT" (information technology) department that can assist users with such tasks. In many smaller businesses and in homes (e.g., SOHO—small office/home office) situations, professional assistance is not readily available. In some cases, the user may employ on-line help or tutorials, but these resources are clumsy and few have the patience required to navigate them. In other cases, the user may pay hourly or per call charges for technical assistance.

To illustrate the burdens and challenges imposed on computer users, consider the following examples:

Replacing a failed disk drive

Restoring lost data resulting, e.g., from a failed memory device

Installing frequent updates to the operating system

Installing frequent software updates or patches to fix security issues

Adding more user memory (typically DRAM) or other hardware

Installing or upgrading driver software, such as printer drivers

Configuring the computer to use various network resources

Installing new application programs

There are other examples; these are merely illustrative. Some of these tasks are merely tiresome and annoying, while others require technical competence beyond that of most users. Until now, no current system has been developed to alleviate such burdens on computer users.

Because most of the above-described problems stem from each user having to configure and maintain a separate PC, one approach has been to move as much of the processing as possible to central servers and allow users to access applications hosted by these central servers via the Internet. The burdens placed on the individual PCs are much less, since they only need to have basic Web browser functionality.

For example, Application Service Providers (ASPs) provide applications to individuals or organizations across the Internet or other network connections. Hosted applications can vary, but examples include financial applications (like general ledger or purchasing software) and office applications, e.g., word processors, spreadsheet programs, etc.

Unfortunately, the applications hosted by ASPs are often slow and not very responsive due to system load, network bandwidth, and latency issues. As a result, ASPs cannot generally guarantee a particular quality of service (QoS) for a given application.

Thin-client systems, like Citrix™, as well as emulation programs, such as Attachmate™, sometimes provide better performance. Attachmate™, for example, Web-enables legacy host applications. Such applications run on thin terminals, often in character mode (black screen dumb terminal). However, not every application can be made to work with emulation programs like Attachmate™. Furthermore, setting up these applications is complicated, typically requiring an IT professional to configure and maintain the application.

Another conventional technique that attempts to address the problems described above is virtual machine (VM) technology. VM technology allows multiple operating systems to run concurrently on a single machine. Each VM emulates the hardware and software of a stand-alone computer, including its CPU, sound, video, and network adapters, etc., in a self-contained, isolated environment.

In particular, Virtual PC™ and Virtual Server™, developed by Connectix and Microsoft, allow one or more legacy operating systems to run on the same computer system as the current Windows operating system. Today, many older x86-based operating systems are supported by Virtual PC and Virtual Server. Virtual PC for Mac allows for one or more other operating systems to run the Macintosh operating system, allowing users to run a Windows operating system and Windows applications on a Mac.

VM technology serves a variety of purposes. It enables hardware consolidation, because multiple operating systems can run on one computer. Key applications for VM technology include cross-platform integration as well as the following:

Legacy application migration. Legacy operating systems and applications can run on new hardware along with more recent operating systems and applications.

Server consolidation. If several servers run applications that consume only a fraction of the available resources, VM technology can be used to enable them to run side by side on a single server, even if they require different versions of the operating system or middleware.

Isolation for development, testing and technical support. Each VM acts as a separate environment, which reduces risk and enables developers to quickly recreate different operating system configurations or compare versions of applications designed for different operating systems. In addition, a developer can test an early version of an application in a VM without fear of destabilizing the system for other users.

Software demonstrations. VM technology allows users to recreate a clean operating system environment or system configuration quickly.

Courseware delivery and training. Organizations can configure and deploy a variety of training scenarios quickly.

Software distribution. IT groups can deliver prevalidated configurations for complex software solutions for fast deployment.

Unfortunately, VM technology also has limitations. For example, an IT professional is generally required to create and set up each VM running on a Virtual Server. There is no automated method by which a novice user may remotely log into a Virtual Server and have a VM automatically created and initialized with all of the software and settings needed for the user to immediately begin working on a desired task.

DETAILED DESCRIPTION

Figure 1:
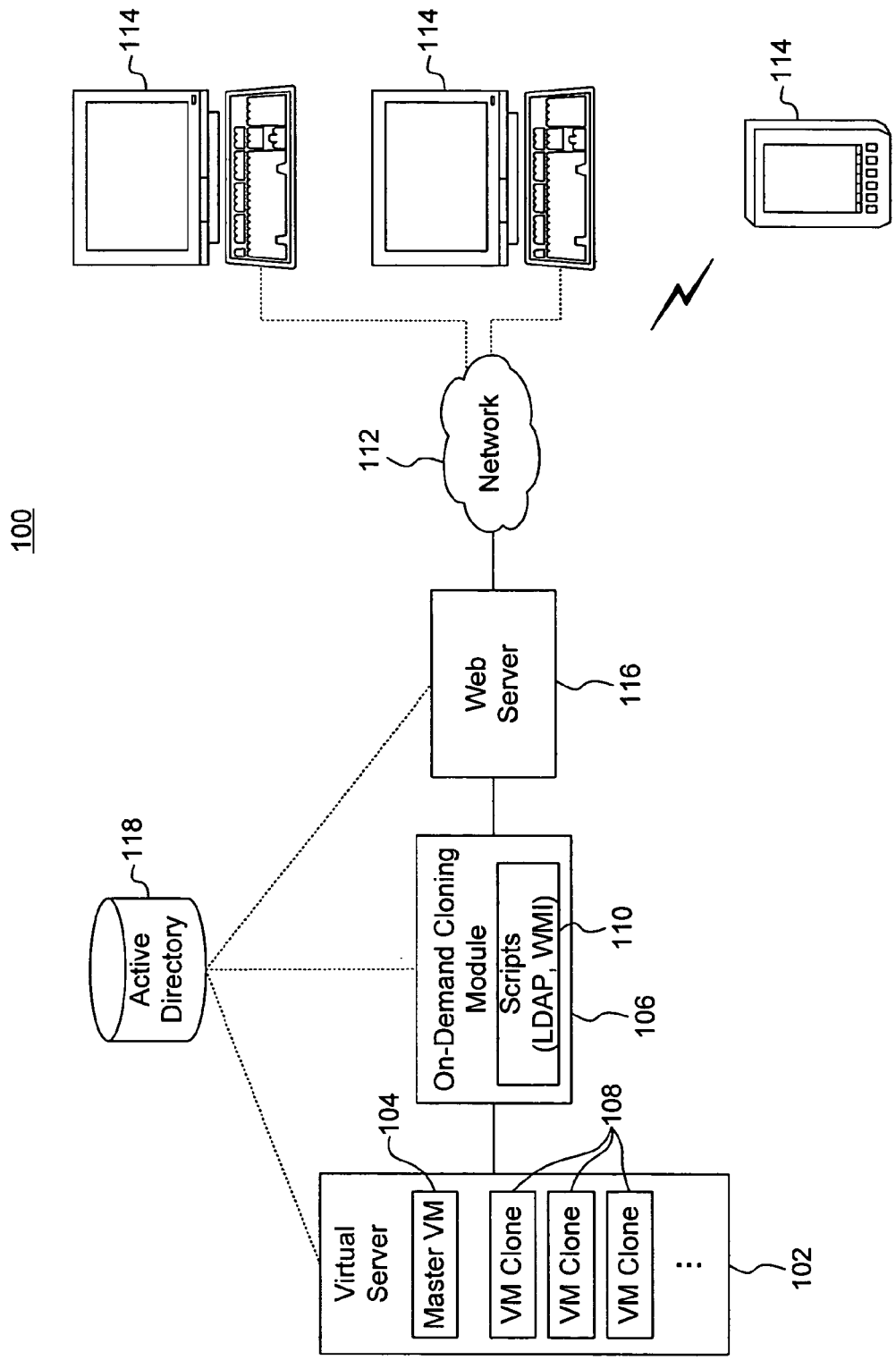
FIG. 1 is a block diagram of a system for on-demand cloning of virtual machines.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a block diagram of a system 100 for on-demand cloning of virtual machines (VMs). As previously noted, a VM emulates the hardware and software of a stand-alone computer, including its CPU, sound, video, and network adapters, etc., in a self-contained, isolated environment. In one embodiment, the system 100 includes one or more virtual servers 102, such as Microsoft Virtual Server 2005™, for creating and managing one or more VMs.

As will be described in greater detail hereafter, the virtual server 102 may be pre-configured with one or more master VMs 104, which are "templates" of PCs including all of the necessary software and settings. In one embodiment, the system 100 also includes an on-demand cloning module 106 for automatically creating a VM clone 108, based on one of the master VMs 104, whenever a user needs to use a PC with a particular configuration. As explained below, the cloning of VMs may be accomplished, in one embodiment, using one or more scripts 110, such as LDAP (Lightweight Directory Access Protocol) and WMI (Windows Management Instrumentation) scripts.

Each VM clone 108 may be accessed and used over a network 112, such as a Local Area Network (LAN) or the Internet, by a different remote computer 114. In one embodiment, the ASPX framework may be used, although the system 100 is not limited to any particular framework or programming language. As illustrated, remote computers 114 may be embodied in a variety of form factors, including desktop and pocket computers. Moreover, the remote computers 114 may access the network using any wired and wireless technology.

A standard Web server 116, such as Microsoft's Internet Information Server (IIS) or the like, may provide the remote computers 114 with online access to VMs on the virtual server 102. Such access may include, for example, replicating screen displays generated by the VMs on the remote computers 114, and forwarding user input from the remote computers 114 to the respective VMs.

In one embodiment, an active directory 118 provides authentication and directory services to the virtual server 102, on-demand cloning module 106, and Web server 116. An active directory 118 is a hierarchical collection of network resources that can contain users, computers, printers, and other Active Directories. Active Directory Services (ADS) allow administrators to handle and maintain all network resources from a single location.

Figure 2A:
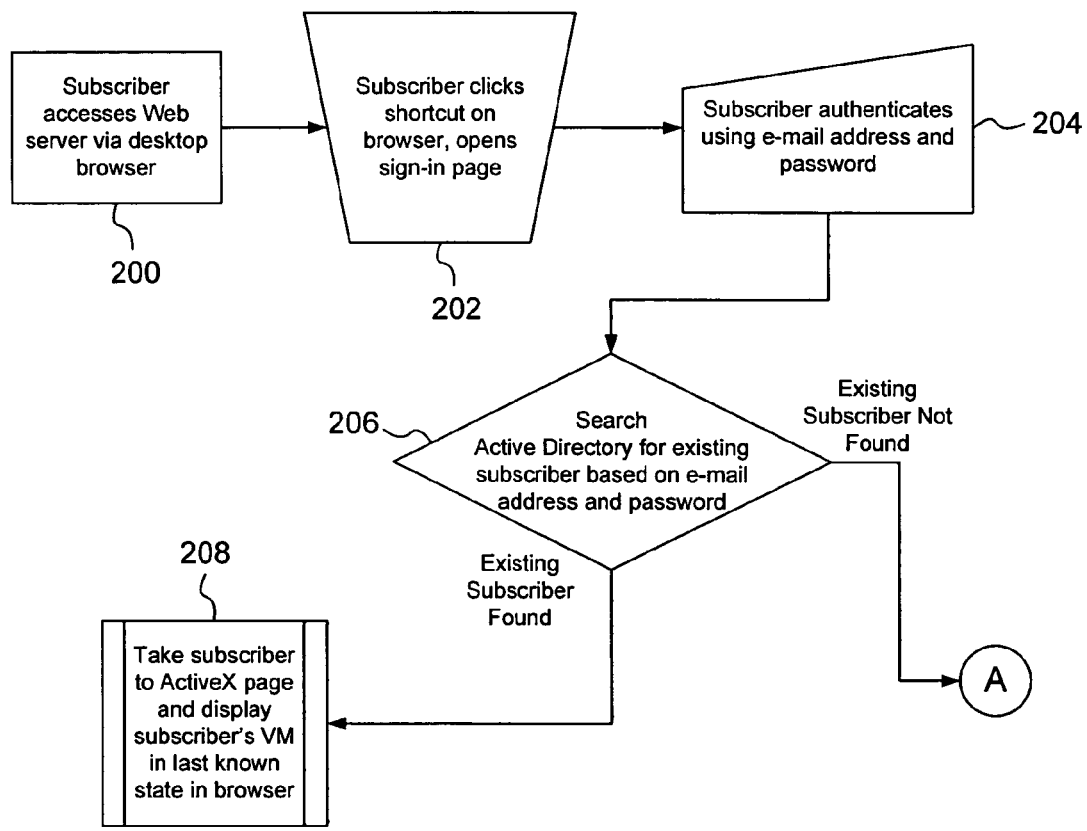
FIG. 2A is a flowchart of a process for on-demand cloning of virtual machines.
Figure 2B:
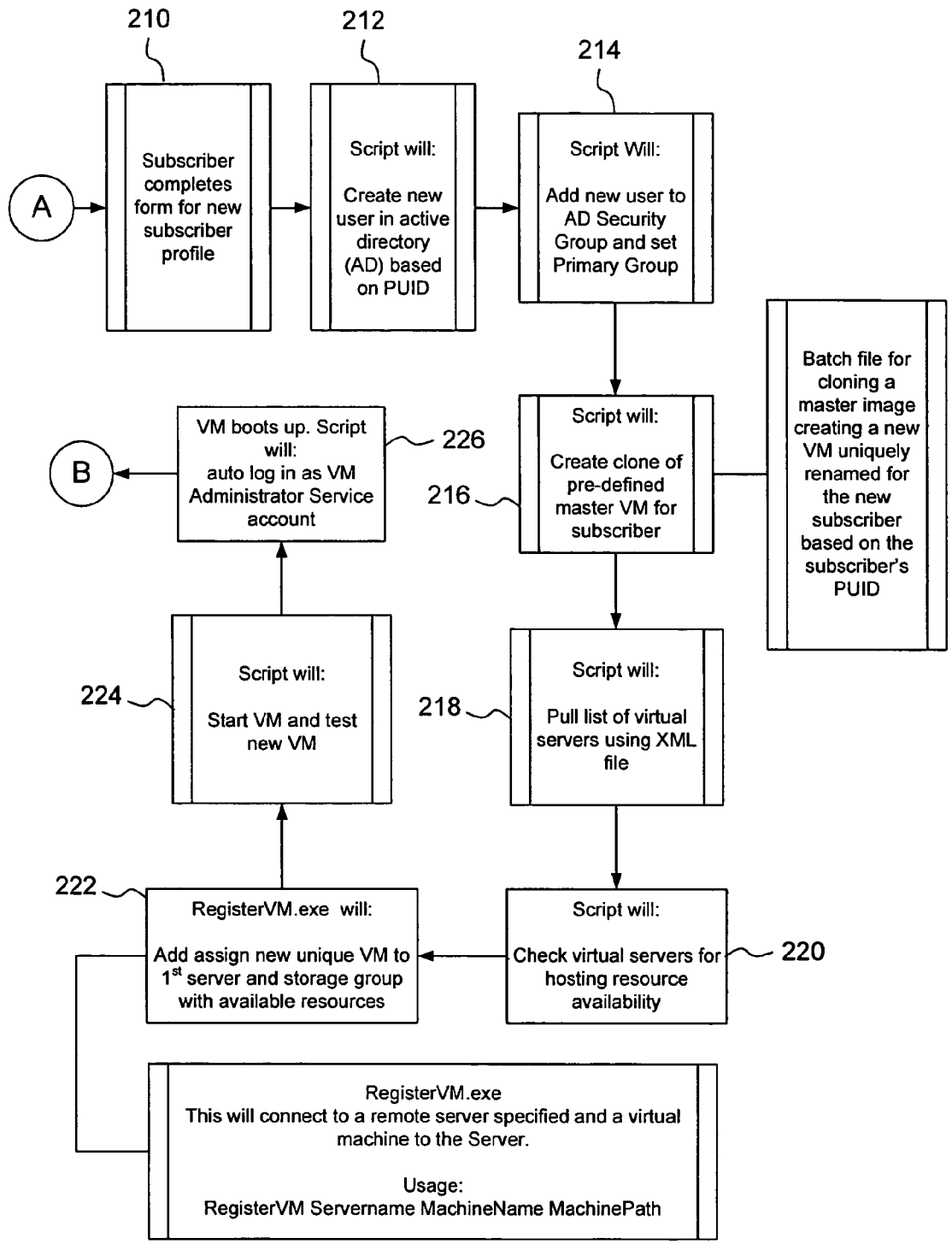
FIG. 2B is a continuation of the flowchart of FIG. 2A.
Figure 2C:
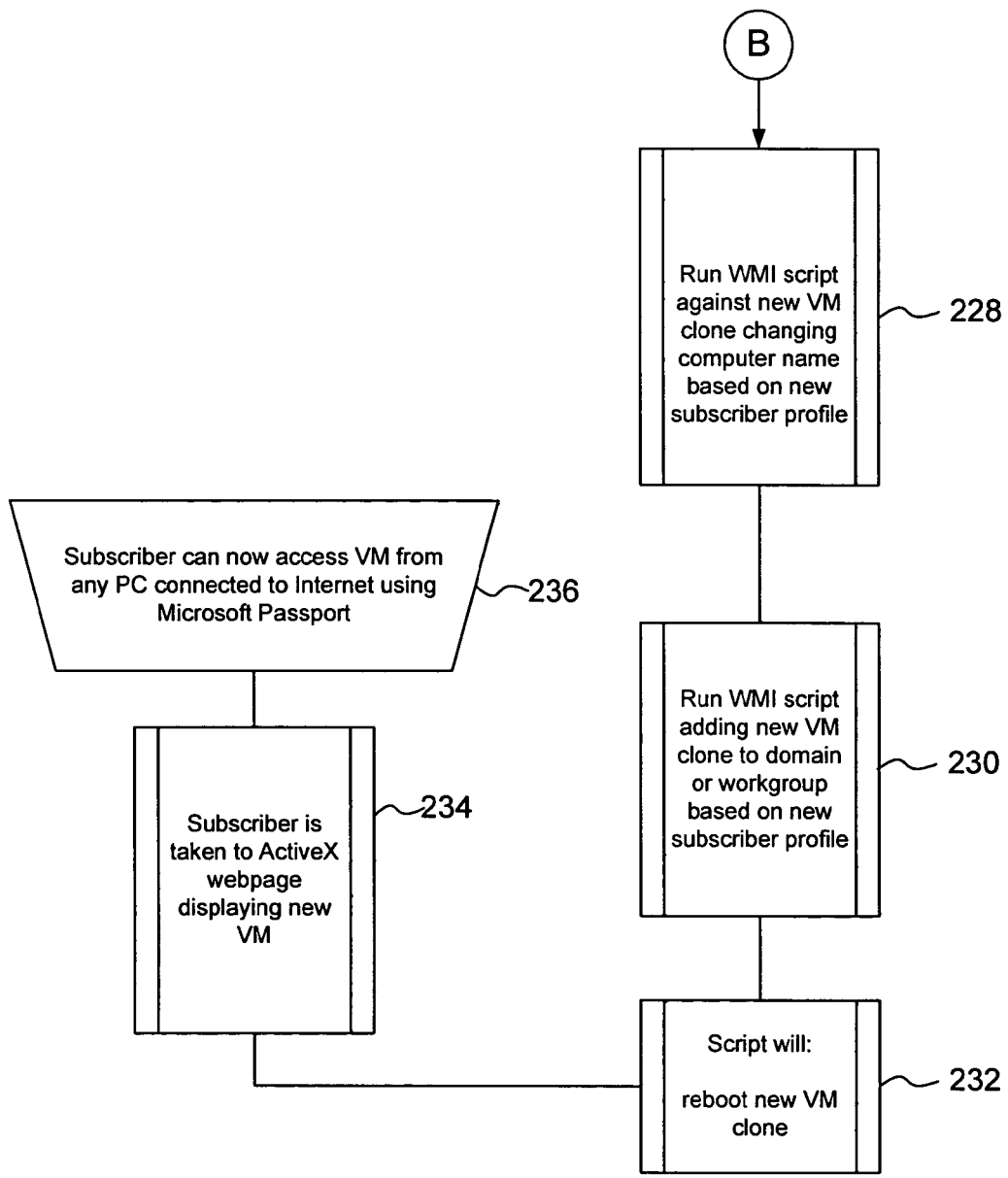
FIG. 2C is a continuation of the flowcharts of FIGS. 2A and 2B.

FIGS. 2A-2C are a flowchart of an exemplary process for on-demand cloning of VMs. While the process is shown in the context of a subscriber establishing a new VM for use over the Internet, a similar process could provide VMs to employees within a corporation or the like, as will be described hereafter.

Referring to block 200 of FIG. 2A, a subscriber uses a Web browser to access the Web server 116 of FIG. 1. This may be accomplished, for example, by providing the Web browser with a URL (Uniform Resource Locator) of the Web server 116, e.g., www.myvpc.net.

Figure 3:
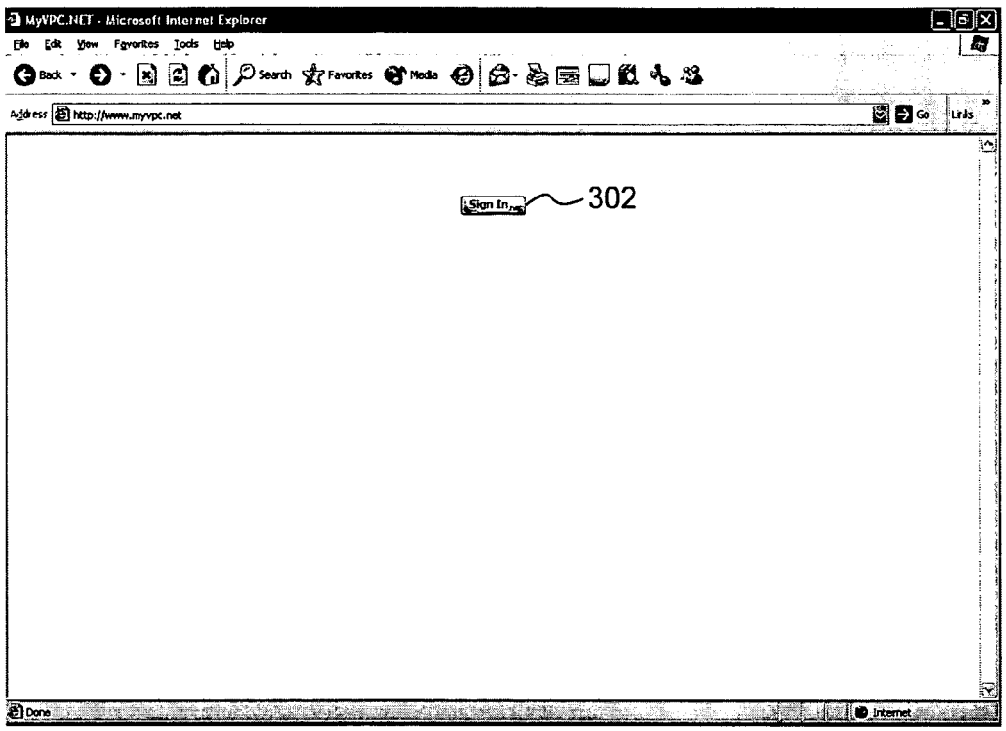
FIG. 3 is a screen shot of a shortcut.
Figure 4:
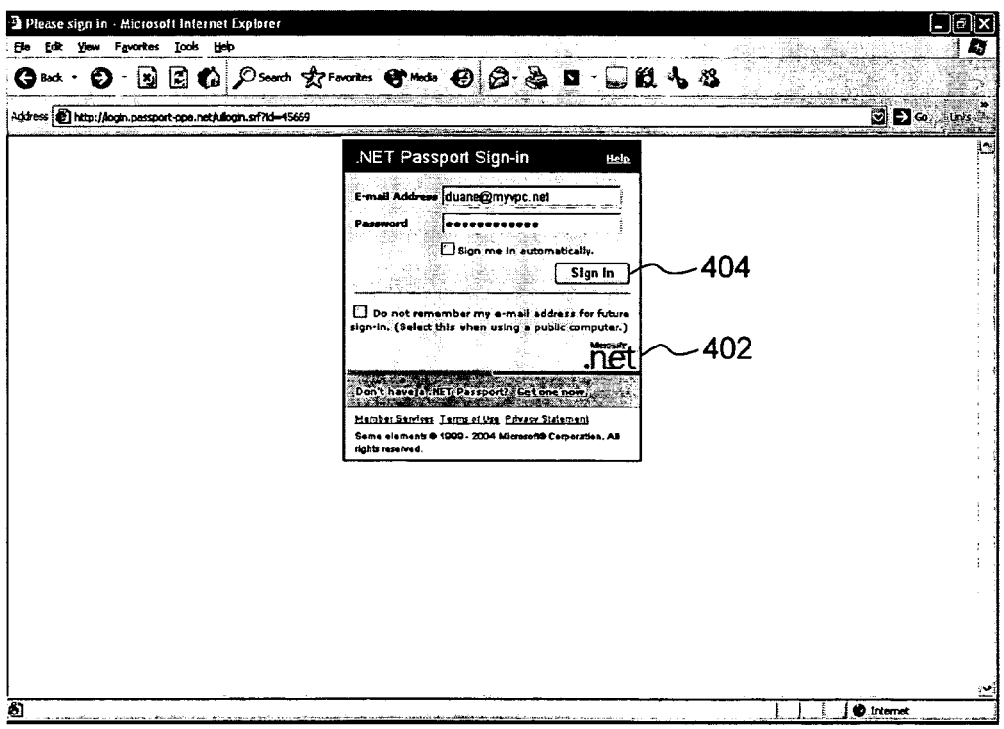
FIG. 4 is a screen shot of a sign-in page.

Continuing to block 202, the subscriber clicks on a shortcut displayed in the browser in order to open a sign-in page. An example of a shortcut 302 is shown in FIG. 3. One possible sign-in page 402 is shown in FIG. 4. In this example, the sign-in page 402 is a .NET Passport sign-in page, although other authentication technologies may be used. In block 204, the subscriber authenticates with the system 100 by providing one or more login credentials and password (assuming a .NET Passport has already been established for the subscriber), after which the subscriber may click on a "sign-in" button 404 or the like.

In block 206, the system may search the active directory 118 of FIG. 1 for an existing subscriber based on the subscriber's PUID (.NET Passport Unique ID). In one embodiment, the PUID is returned by the sign-in page 402 when the subscriber is successfully authenticated. NET Passport is a Microsoft-operated service that provides Internet authentication for Web sites, no matter what kind of devices they use for access. It provides reliable Internet authentication and allows users to sign in once to access a variety of .NET Passport-enabled Web sites. To log in to a Passport-enabled site, users present credentials to Passport (via the SSI interface) and get an encrypted ticket cookie containing PUID that is decrypted by the site and used to authenticate them. A PUID is a 16-character string in the HexPUID property of the PassportIdentity class.

If an existing subscriber (PUID) is found in the active directory 118, control passes to block 208, in which the subscriber is taken to an ActiveX page that displays, in the subscriber's browser, his or her VM in its last known state. While ActiveX is used to display the VM in one embodiment, other technologies may be used within the scope of the invention.

Figure 5:
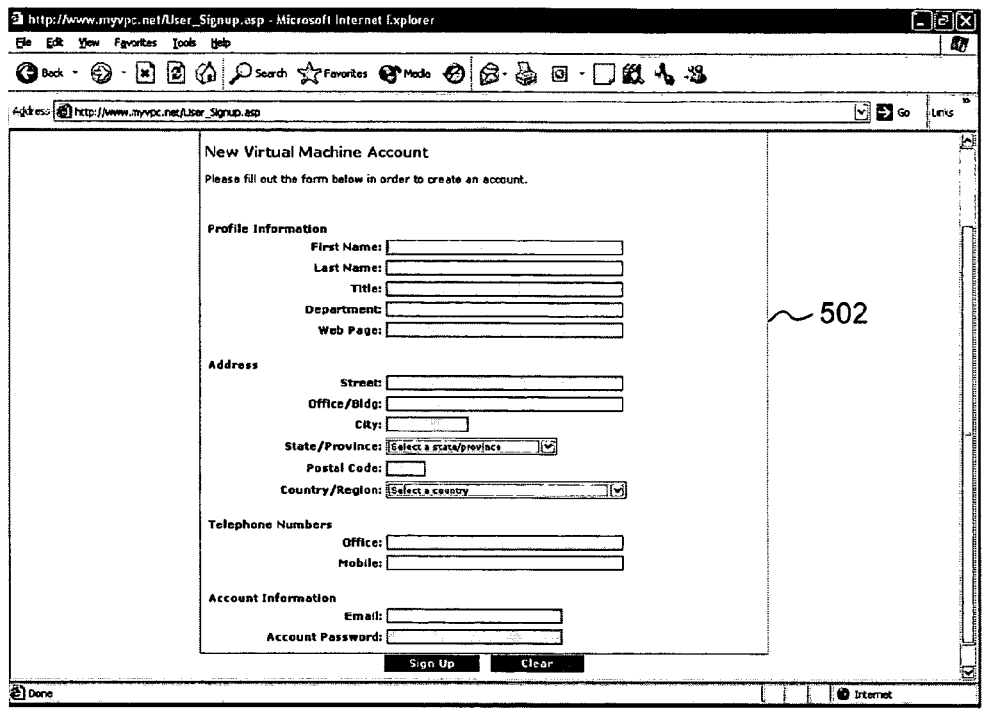
FIG. 5 is a screen shot of a subscriber profile form.

If, however, an existing subscriber is not found, control passes to block 210 of FIG. 2B, in which the subscriber is asked to complete a profile form. As shown in FIG. 5, a subscriber profile form 502 may require the subscriber to provide, for example, his or her name, address, telephone number, billing information, and the like.

Figure 6:
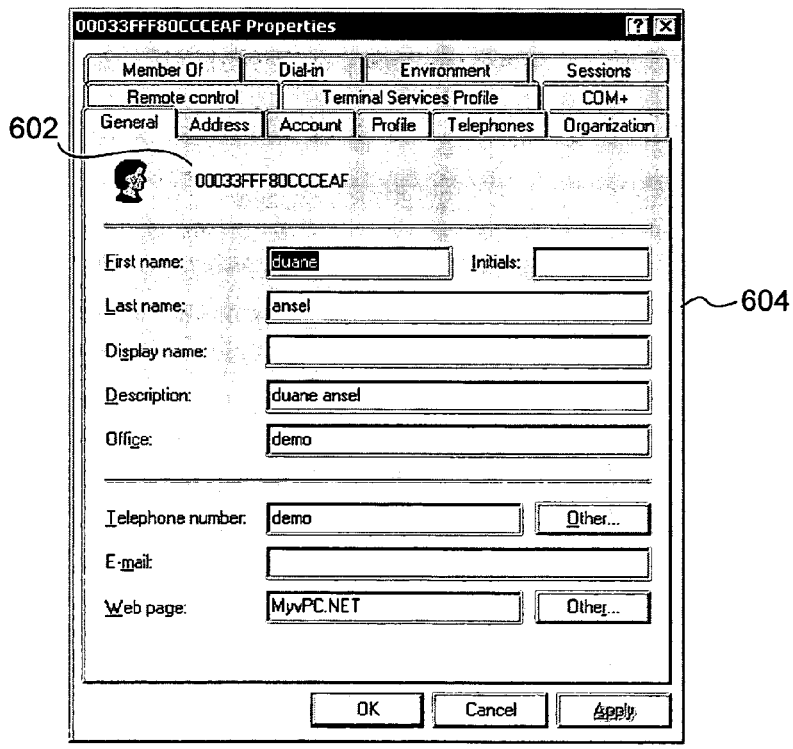
FIG. 6 is a screen shot of a user properties window.

Once the form 502 has been completed, control passes to block 212, in which the on-demand cloning module uses a script 110 to create a new user object in the active directory 118 based, in one embodiment, on the subscriber's PUID. An example screen shot showing the creation of a new user is provided in FIG. 6. As illustrated, the new subscriber is identified by the 16-character PUID 602. The relevant information may be automatically completed in the "General" tab of the user properties window 604 based on the information provided in the subscriber profile form 502. An example script 110 for carrying out this process is as follows:

```
Imports System.DirectoryServices
Public Class User_Signup
    Inherits System.Web.UI.Page
    Protected WithEvents TABLE1 As System.Web.UI.WebControls.Table
    Protected WithEvents btnSignUp As System.Web.UI.WebControls.Button
    Protected WithEvents txtUsername As System.Web.UI.WebControls.TextBox
    Protected WithEvents txtPassword As System.Web.UI.WebControls.TextBox
    Protected WithEvents txtPasswordConfirm As System.Web.UI.WebControls.TextBox
    Protected WithEvents txtFirstName As System.Web.UI.WebControls.TextBox
    Protected WithEvents txtLastName As System.Web.UI.WebControls.TextBox
    Protected WithEvents txtStreet As System.Web.UI.WebControls.TextBox
    Protected WithEvents txtCity As System.Web.UI.WebControls.TextBox
    Protected WithEvents txtState As System.Web.UI.WebControls.TextBox
    Protected WithEvents txtPostalCode As System.Web.UI.WebControls.TextBox
    Protected WithEvents txtCountry As System.Web.UI.WebControls.TextBox
    Protected WithEvents txtEmail As System.Web.UI.WebControls.TextBox
#Region " Web Form Designer Generated Code "
    'This call is required by the Web Form Designer.
    <System.Diagnostics.DebuggerStepThrough( )> Private Sub InitializeComponent( )
    End Sub
    Private Sub Page_Init(ByVal sender As System.Object, ByVal e As System.EventArgs) Handles MyBase.Init
        'CODEGEN: This method call is required by the Web Form Designer
        'Do not modify it using the code editor.
        InitializeComponent( )
    End Sub
#End Region
    Private Sub Page_Load(ByVal sender As System.Object, ByVal e As System.EventArgs) Handles MyBase.Load
        'Put user code to initialize the page here
    End Sub
    Private Sub SignUp_Click(ByVal s As System.Object, ByVal e As System.EventArgs) Handles btnSignUp.Click
        "Add User to Active Directory
        Dim strDisplayName = txtFirstName.Text & " " & txtLastName.Text
        Try
            Dim strPath As String = ConfigurationSettings.AppSettings("LDAPString")
            Dim myDirectoryEntry As New DirectoryEntry(strPath, ConfigurationSettings.AppSettings("LDAPUser"), "Amsterdam05")
            Dim myNewUser As New DirectoryEntry( )
            myDirectoryEntry.UsePropertyCache = True
            myNewUser = myDirectoryEntry.Children.Add("CN=" & txtFirstName.Text & " " & txtLastName.Text, "user")
            myNewUser.Properties("sAMAccountName").Value= txtUsername.Text
            myNewUser.Properties("givenname").Add(txtFirstName.Text)
            myNewUser.Properties("sn").Add(txtLastName.Text)
            myNewUser.Properties("displayname").Add(strDisplayName)
            'myNewUser.Properties("homeDirectory").Add(ConfigurationSettings.AppSettings("PhysicalPathtoVMs") & txtUsername.Text)
            myNewUser.CommitChanges( )
```

```
            'myNewUser.Password = txtPassword.Text
            myNewUser.Invoke("SetPassword", "Amsterdam0333")
            Dim userflags As Object =
myNewUser.Properties("UserAccountControl")
            myNewUser.Properties("UserAccountControl").Value = &H220
            myNewUser.Properties("pwdlastset").Value = 0
            'myNewUser.Properties("memberOf")(0).Value = "CN=VM
User,OU=VM_Accounts,DC=TCEDMZ,DC=local"
            myNewUser.CommitChanges( )
System.Diagnostics.Process.Start(ConfigurationSettings.AppSettings("Physical
PathtoTools") & "InitialSignup\InitialSignup", txtUsername.Text)
System.Diagnostics.Process.Start(ConfigurationSettings.AppSettings("Physical
PathtoTools") & "RegisterVM\RegisterVM", "dmzvpc03 " & txtUsername.Text &
"_Original-XPPro.vmc " &
ConfigurationSettings.AppSettings("PhysicalPathtoVMs") &
txtUsername.Text & "\")
            Catch ex As Exception
                Response.Write(ex.Message)
            End Try
        End Sub
End Class
```

Figure 7:
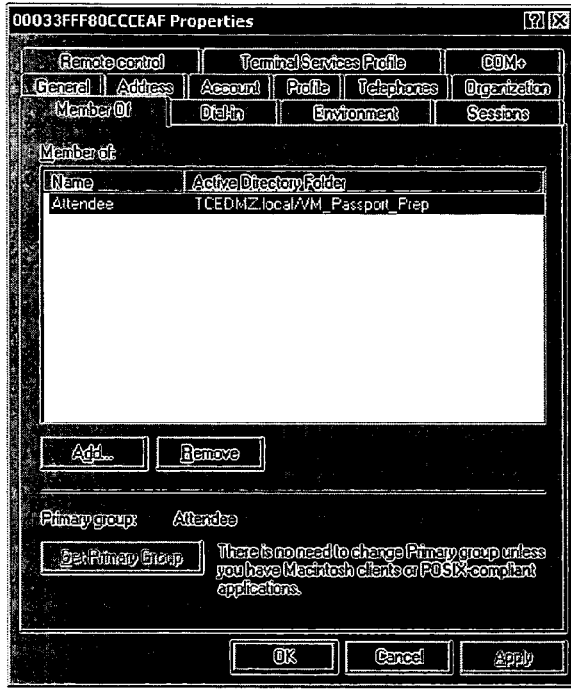
FIG. 7 is a screen shot of a user properties window.

Once the new user has been created in the active directory 118, the script 110 continues at block 214 to add the new user to the security group of the active directory 118, as well as to set the primary group and give the user a full permission set. As shown in FIG. 7, the script 110 may do this automatically within the "Member of" tab of the user properties window 604.

Continuing to block 216, the on-demand cloning module 106 then creates a VM clone 108 from a pre-defined master VM 104 for the new user. In certain embodiments, the user may be able to select from a number of master VMs 104 that have been optimized for different tasks, i.e., word processing, accounting, gaming, etc. The cloning is accomplished, in one implementation, using a batch file that copies a base image of the master VM 104, creating a new VM clone 108 uniquely renamed for the new subscriber based on the subscriber's PUID 602 (or other unique information, such as e-mail address, login credentials, or other identifying information provided by the user). An example script 110 for carrying out this process is as follows:

```
Imports System.IO
Module Module1
    Sub Main(ByVal CmdArgs( ) As String)
        ' 1. Create New User Directory under VirtualMachines Dir
        ' 2. Move 1st available Master XPPro VM
        ' Syntax: InitialSignup
        '      CmdArgs:
        '             0 - Username
        Dim config As Configuration.ConfigurationSettings
        Dim i As Integer
        Dim objFileWriter As StreamWriter
        For i = 1 To 5
            If File.Exists(config.AppSettings("MoveVM-XPProMasterFrom")
& i & " .vmc") Then
                ' Try
                If Not Directory.Exists(config.AppSettings("VMPath") &
CmdArgs(0)) Then
Directory.CreateDirectory(config.AppSettings("VMPath") & CmdArgs(0))
                End If
                System.IO.File.Move(config.AppSettings("MoveVM-
XPProMasterFrom") & i & ".vmc", config.AppSettings("VMPath") &
CmdArgs(0) & "\" & CmdArgs(0) & "_Original-XPPro.vmc")
                System.IO.File.Move(config.AppSettings("MoveVM-
XPProMasterFrom") & i & ".vhd", config.AppSettings("VMPath") &
CmdArgs(0) & "\" & CmdArgs(0) & "_Original-XPPro.vhd")
                FileReplace(config.AppSettings("VMPath") & CmdArgs(0) &
"\" & CmdArgs(0) & "_Original-XPPro.vmc", "111222333444555", CmdArgs(0)
& "\" & CmdArgs(0) & "_Original-XPPro")
                FileReplace(config.AppSettings("VMPath") & CmdArgs(0) &
"\" & CmdArgs(0) & "_Original-XPPro.vmc", "555444333222111", "UTF(−
16)")
                Exit Sub
            End If
        Next
    End Sub
    Sub FileReplace(ByVal filePath As String, ByVal oldString As
String, ByVal newString As String)
        Dim sr As StreamReader = New StreamReader(filePath)
        Dim file As String = sr.ReadToEnd( )
        sr.Close( )
        file = file.Replace(oldString, newString)
```

```
            Dim sw As StreamWriter = New StreamWriter(filePath)
            sw.Write(file)
            sw.Close( )
      End Sub
End Module
```

Figure 8:
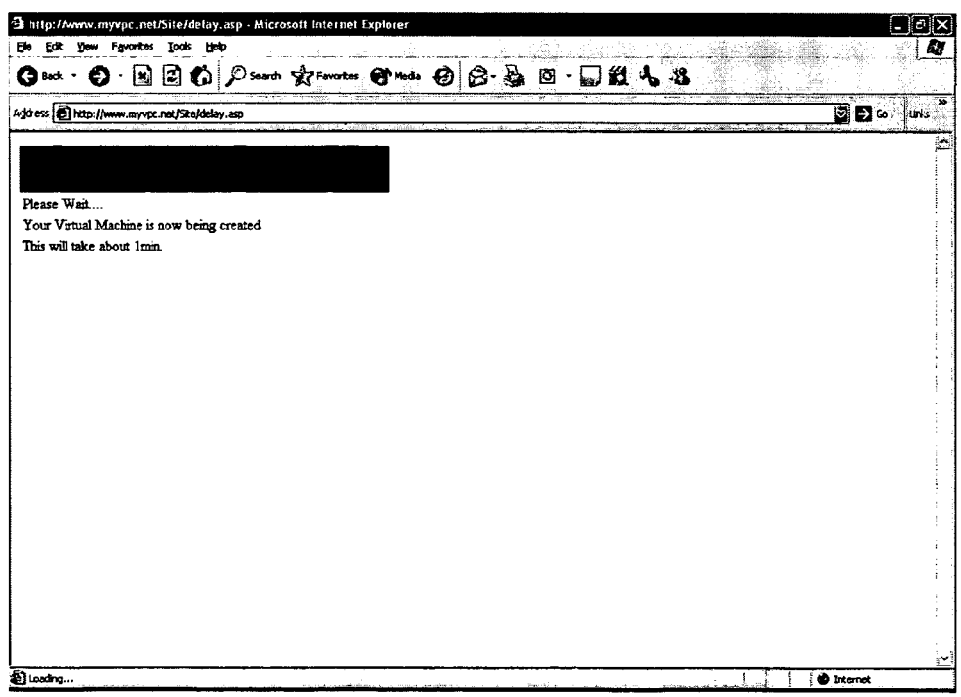
FIG. 8 is a screen shot of a Web page displayed while a VM clone is being created.

While the VM clone 108 is being created, the user may be prompted to wait, as shown in the browser of FIG. 8, since the process of copying the base image may take several seconds or longer depending on its size.

In certain embodiments, multiple virtual servers 102 are provided for load balancing. Accordingly, in block 218, the script 110 may pull a list of potential virtual servers 102 to host the new VM clone 108. The system then attempts to determine which virtual server 102 has the resources (e.g., available memory, CPU resources, etc.) to best handle the new VM clone 108. In one implementation, this is done in block 220 using an XML (eXtensible Markup Language) file, which pings each of the virtual servers 102 to determine resource availability.

Once a virtual server 102 has been selected, control passes to block 222, in which the new VM clone 108 is added to the virtual server 102. This may be accomplished, in one embodiment, using a RegisterVM.exe program, which has the usage "RegisterVM ServerName MachineName MachinePath." Other programs or techniques may also be used for this purpose. A supporting script 110 for this process is as follows:

```
Imports System.Reflection
Imports System.Runtime.InteropServices
Imports Microsoft.VirtualServer.Interop
Public Class InitVS
      <DllImport("ole32.dll", _
            PreserveSig:=False, _
            ExactSpelling:=True, _
            EntryPoint:="CoInitializeSecurity", _
            CallingConvention:=CallingConvention.StdCall, _
            SetlastError:=False)> _
      Private Shared Sub CoInitializeSecurity( _
            ByVal pSD As IntPtr, _
            ByVal cAuthSvc As UInt32, _
            ByVal asAuthSvc As IntPtr, _
            ByVal pReserved1 As IntPtr, _
            ByVal dwAuthnlevel As UInt32, _
            ByVal dwImpLevel As UInt32, _
            ByVal pAuthInfo As IntPtr, _
            ByVal dwCapabilities As UInt32, _
            ByVal pvReserved2 As IntPtr)
      End Sub
      Private Const RPC__C__AUTHN__LEVEL__NONE As Long = 1
      Private Const RPC__C__IMP__LEVEL__IMPERSONATE As Long = 3
      Private Const EOAC__NONE As Long = 0
      Public Sub New( )
            CoInitializeSecurity(System.IntPtr.Zero, _
                  Convert.ToUInt32(0), _
                  System.IntPtr.Zero, _
                  System.IntPtr.Zero, _
                  Convert.ToUInt32(RPC__C__AUTHN__LEVEL__NONE), _
                  Convert.ToUInt32(RPC__C__IMP__LEVEL__IMPERSONATE), _
                  System.IntPtr.Zero, _
                  Convert.ToUInt32(EOAC__NONE), _
                  System.IntPtr.Zero)
      End Sub
      Public Function GetVMVirtualServerClass(ByVal server As String) _
            As VMVirtualServerClass
            Dim typeVSClass As Type
            Dim typeDCOM As Type
            Dim objDCOM As Object
            typeVSClass = GetType(VMVirtualServerClass)
            typeDCOM = Type.GetTypeFromCLSID(typeVSClass.GUID, server, True)
            objDCOM = Activator.CreateInstance(typeDCOM)
            GetVMVirtualServerClass = CType( _
                  Marshal.CreateWrapperOfType(objDCOM, typeVSClass), _
                  VMVirtualServerClass)
      End Function
      'Get VMVirtualServerClass instance from local server using COM
      Public Function GetVMVirtualServerClass( ) As VMVirtualServerClass
            GetVMVirtualServerClass = New VMVirtualServerClass
      End Function
End Class
Module RegisterVM
      <MTAThread( )> _
      Sub Main(ByVal CmdArgs( ) As String)        ' Initialize COM with
```

-continued

```
Impersonate first
    Dim myApp As InitVS
    myApp = New InitVS
    Dim myApp1 As InitVS
    ' Check command line arguments help flag
    If CmdArgs.Length > 0 Then
        If Left$(CmdArgs(0), 1) = "-" Or Left$(CmdArgs(0), 2) =
"/?" Then
            Dim sHelp As String
            sHelp = "USAGE: RegisterVM {servername} {vmcfile}
{vmcpath}
            MsgBox(sHelp, MsgBoxStyle.OKOnly, "ShowVSVersion Help")
            Exit Sub
        End If
    End If
    ' Connect locally or remotely
    Dim myVS As VMVirtualServer
    Dim myVM As VMVirtualMachine
    Dim myVSErrMsg As String
    Try
        If CmdArgs.Length > 0 Then
            myVSErrMsg = " at " & CmdArgs(0)
            myVS = myApp.GetVMVirtualServerClass(CmdArgs(0))
            myVM = myApp1.GetVMVirtualServerClass(CmdArgs(0))
        Else
            myVSErrMsg = "on local machine"
            myVS = myApp.GetVMVirtualServerClass( )
            myVM = myApp1.GetVMVirtualServerClass( )
        End If
    Catch ex As Exception
        MsgBox("Cannot connect to Virtual Server" & myVSErrMsg,
MsgBoxStyle.OKOnly, "ShowVSVersion")
        Exit Sub
    End Try
    myVS.CreateVirtualMachine(CmdArgs(1), CmdArgs(2))
    myVM.AddHardDiskConnection(CmdArgs(2) & CmdArgs(1),
VMDriveBusType.vmDriveBusType_IDE, 0, 1)
    End Sub
End Module
```

Figure 9:
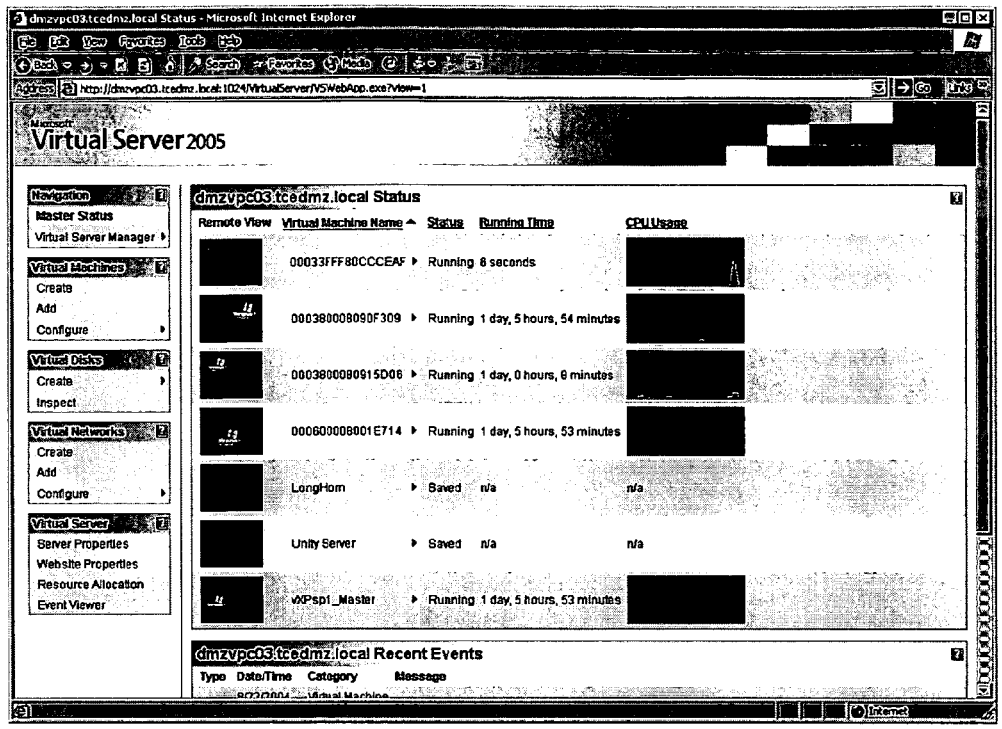
FIG. 9 is a screen shot of a user interface within a virtual server showing running VMs.

Once the new VM clone 108 has been added to the virtual server 102, it will appear in a listing of VMs on the virtual server 102, as shown in FIG. 9. In the present example, the new VM clone 108 is at the top of the list and shows a running time of 6 seconds. Note that each of the VM clones 108 have a "virtual machine name" based on a different PUID 602 for a respective subscriber.

Figure 10:
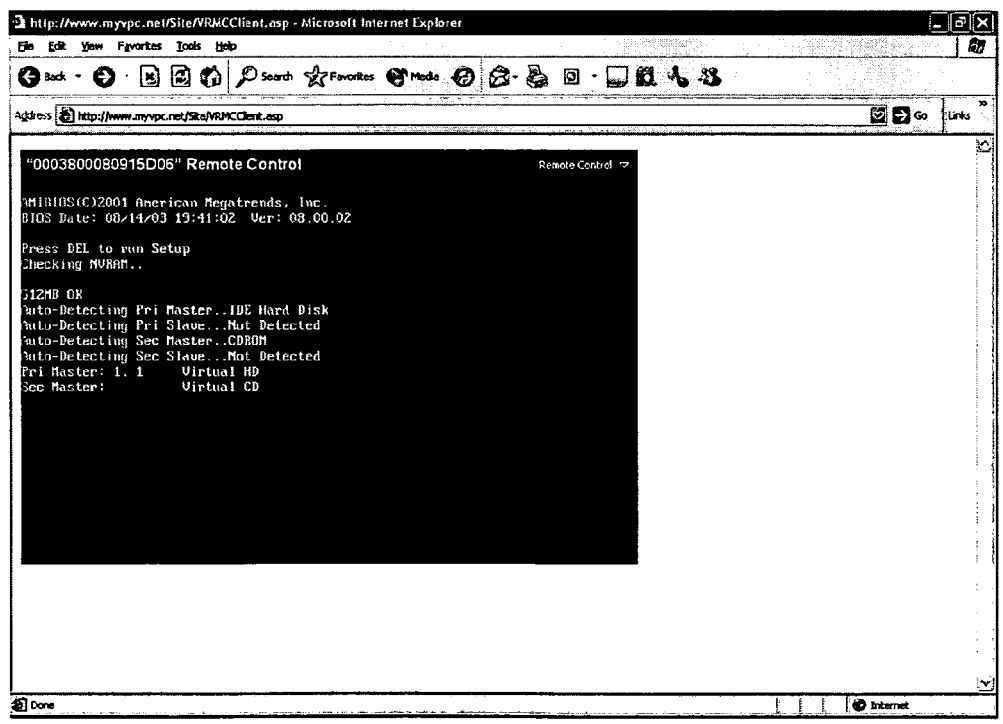
FIG. 10 is a screen shot of a boot process for an operating system.
Figure 11:
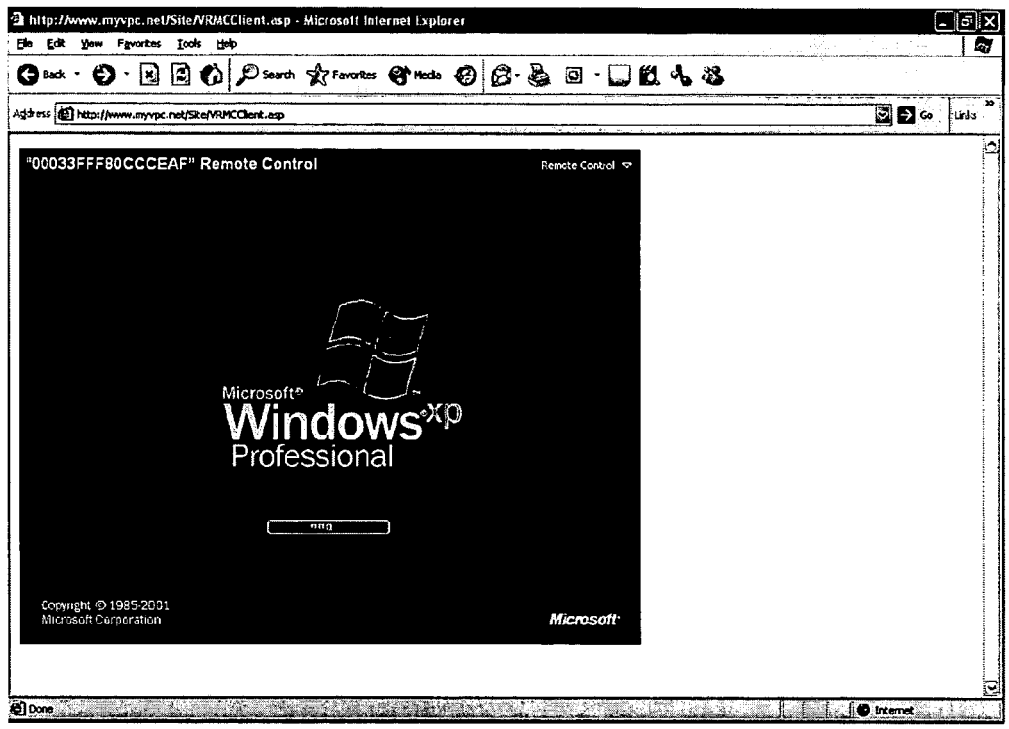
FIG. 11 is a screen shot of a boot process for an operating system.

Continuing at block 224, the script 110 starts and tests the new VM clone 108. FIG. 10 illustrates a POST (Power On Self Test) screen generated by the VM clone during the booting process, which is displayed in the subscriber's browser. Thereafter, as shown in FIG. 11, the Windows XP™ (or another OS) startup screen is displayed as the VM clone 108 continues by loading the installed OS.

Figure 12:
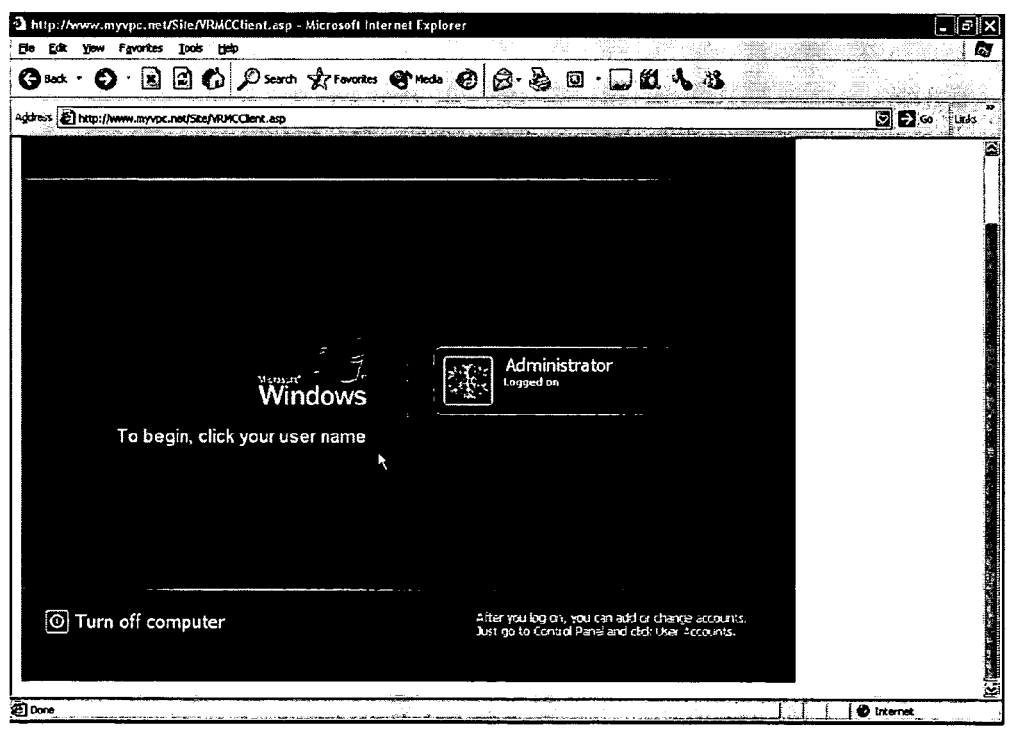
FIG. 12 is a screen shot of a login process for an operating system.

At block 226, the script 110 may initiate an auto-login procedure, as shown in FIG. 12, causing the VM clone 108 to automatically log into the "Administrator" account, or another account with suitable privileges to permit system-level changes to various OS settings, as described below. A modification to the system registry for accomplishing the auto-login procedure is as follows:

```
Windows Registry Editor Version 5.00
[HKEY_LOCAL_MACHINE\SOFTWARE\Microsoft\Windows
NT\CurrentVersion\Winlogon]
"DefaultUserName"="administrator"
"DefaultUserPassword"=""
"AutoAdminLogon "="1"
```

For example, at block 228 of FIG. 2C, the system may run a WMI script against the new VM clone 108, changing the computer name based, in one embodiment, on information from the subscriber profile form 502. An example of a suitable WMI script is as follows:

```
strComputer = "."
Set objWMIService =
GetObject("winmgmts:{impersonationLevel=impersonate}!\\" &
strComputer & "\root\cimv2")
Set colComputers = objWMIService.ExecQuery ("Select * from
Win32_ComputerSystem")
For Each objComputer in colComputers
    err= ObjComputer.Rename(WScript.arguments.item(0))
    Wscript.Echo err
Next
```

Similarly, at block 230, the system may run a WMI script adding the new VM clone 108 to a particular domain or workgroup, also based on information from the subscriber profile form 502. For example, the user may specify that he or she wants to be a part of a particular workgroup or domain of a "virtual office" provided by the present system 100.

Figure 13:
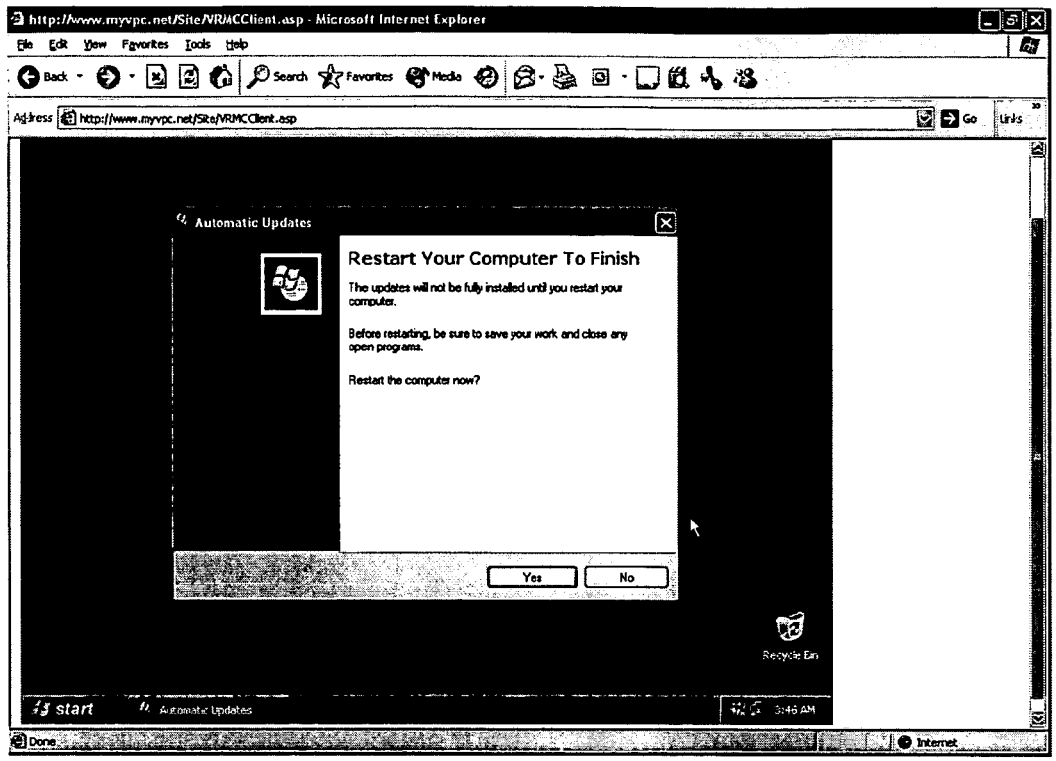
FIG. 13 is a screen shot of a shutdown process for an operating system.

At block 232, the script 110 will reboot the new VM clone 108 to make all of the necessary changes to the system registry (or other similar data structure in a non-Windows 2000/XP environment). The process of shutting down Windows and rebooting is illustrated in FIG. 13, which may be performed automatically without the need for intervention by the subscriber. One possible script for carrying out this procedure may include the command, "shutdown /r /t 1 /d p:2:3 /c 'Shutting Down VM.'"

Figure 14:
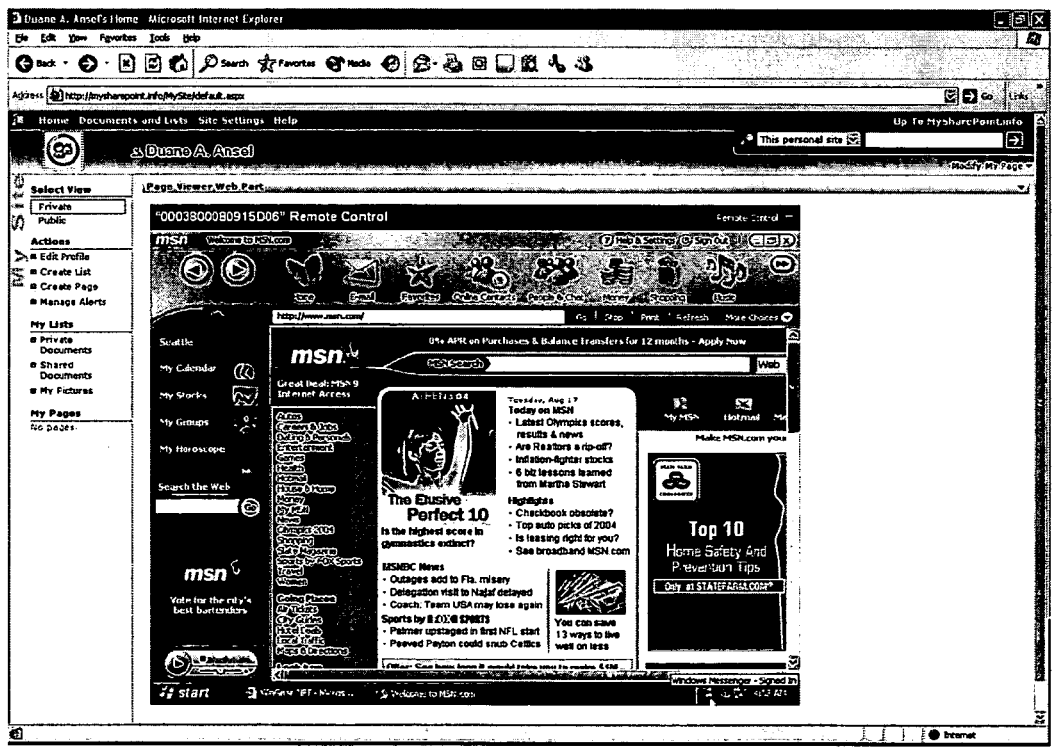
FIG. 14 is a screen shot of a fully-configured and running VM clone.

Once the VM clone 108 has been rebooted, the subscriber is taken, at block 234 to an ActiveX webpage displaying the new VM clone 108, as shown in FIG. 14. The subscriber can then, at block 236, access VM from any PC connected to the Internet using their Microsoft Passport.

Because the VM clones 108 are centrally hosted on one or more virtual servers 102, they may be easily updated or repaired by service personnel without having to make an in-home visit. For example, updates to virus scanners or the operating system, itself, may be automatically made by administrators of the virtual servers 102. Moreover, if the user desires a new software application, the user may simply purchase it online, after which the application may be automatically installed on the user's VM clone 108. Automatic backups of the VM clone 108 may be made daily or even more frequently, permitting service personnel to easily troubleshoot serious problems with a minimum of downtime.

Furthermore, the user may easily "upgrade" the VM clone 108 with more power "hardware." Since the VM clone's "CPU" is merely a share of the processing resources of a physical computer hosting the virtual server 102, that share may be increased or decreased based on the user's needs. In fact, processing, graphics, sound, networking, and other resources can be allocated on an application-by-application basis. For instance, the VM clone 108 may not normally provide computer gaming capability. However, should the user desire to run one of the latest games, his or her "machine" may be temporarily "upgraded" with the requisite virtual hardware, the cost of which would be billed to the user, since the upgraded machine would be using a greater share of the physical host system.

As noted above, the foregoing embodiment is specific to a subscriber creating a new VM clone 108 to be accessed over the Internet. In an alternative embodiment, a corporation may provide its employees with VM clones 108 hosted on a corporate server. Accordingly, rather than providing each employee with a separate, full-featured computer, the corporation may provide each employee with a basic terminal with a Web browser, as well as a hosted VM clone 108 with all of the necessary software and settings for the employee's job description.

Figure 15:
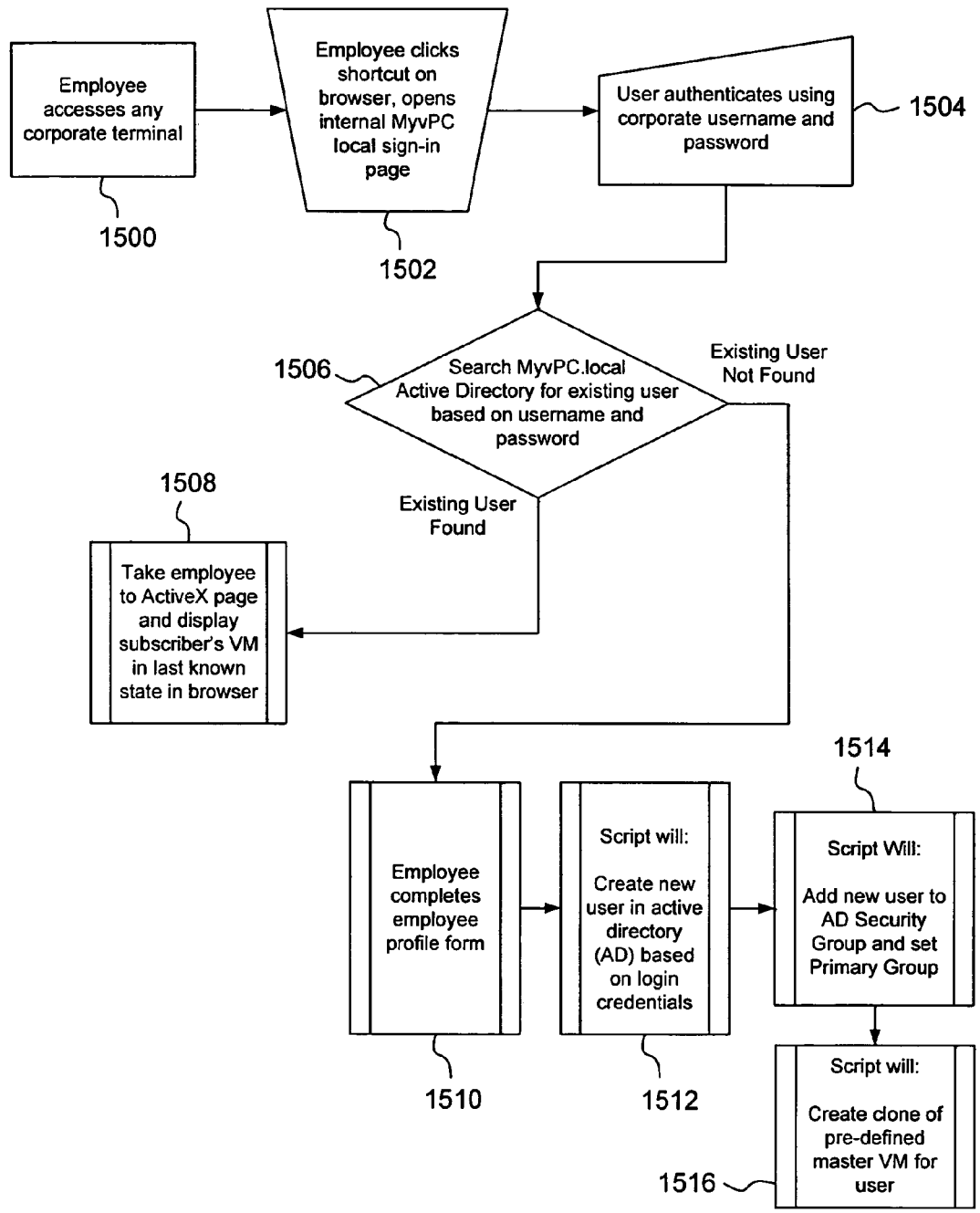
FIG. 15 is a flowchart of a process for on-demand cloning of virtual machines in a corporate environment.
Figure 16:
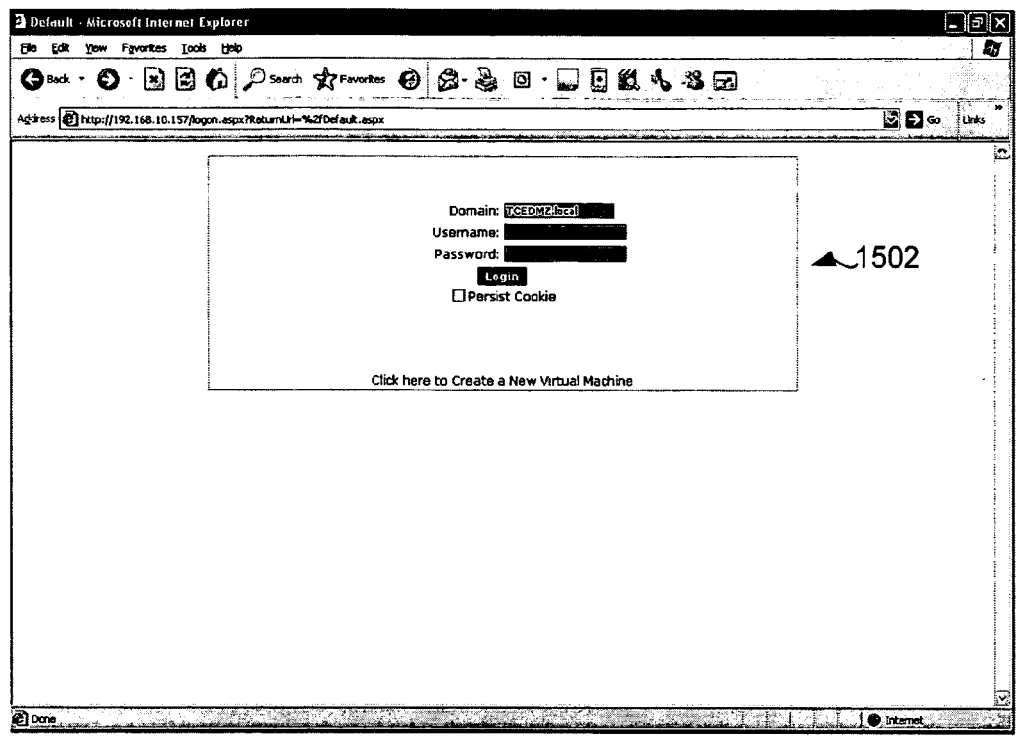
FIG. 16 is a screen shot of a sign-in page in a corporate environment.

The process flow described in FIGS. 2A-2C would only be changed in minor ways in a corporate environment. For example, FIG. 15 partially illustrates the corporate process, which begins at block 1500 with the employee accessing any corporate terminal. Moving to block 1502, the employee clicks on a shortcut, which opens an internal MyvPC.local sign-in page 1502, as illustrated in FIG. 16. In this case, the employee would not log in using .NET Passport (as in FIG. 4), but rather, would log in with the employee's corporate login credentials or a pre-assigned guest/demo/training account.

For greater security, the employee may log in with an external e-mail address. In response, the system 100 may send an e-mail message to the specified address containing a special link to the Web server 116 which facilitates online creation of, or access to, a VM clone 108. Accordingly, the user cannot use a VM clone 108 unless he or she provides a valid external e-mail address during the login procedure.

Figure 17:
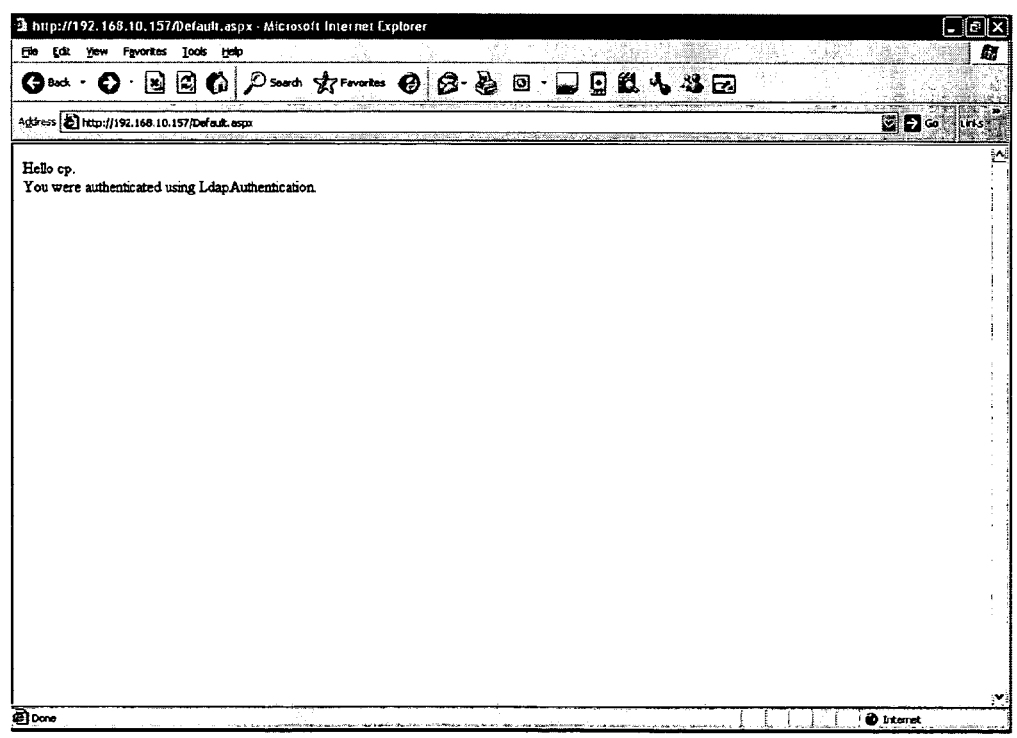
FIG. 17 is a screen shot of a Web page displayed when a user is authenticated.

At block 1504, the user may be authenticated, for example, using standard LDAP authentication. Once the user is authenticated, a screen display similar to the one in FIG. 17 may be shown, which indicates that the user "cp" has been authenticated using LDAP authentication.

Figure 18:
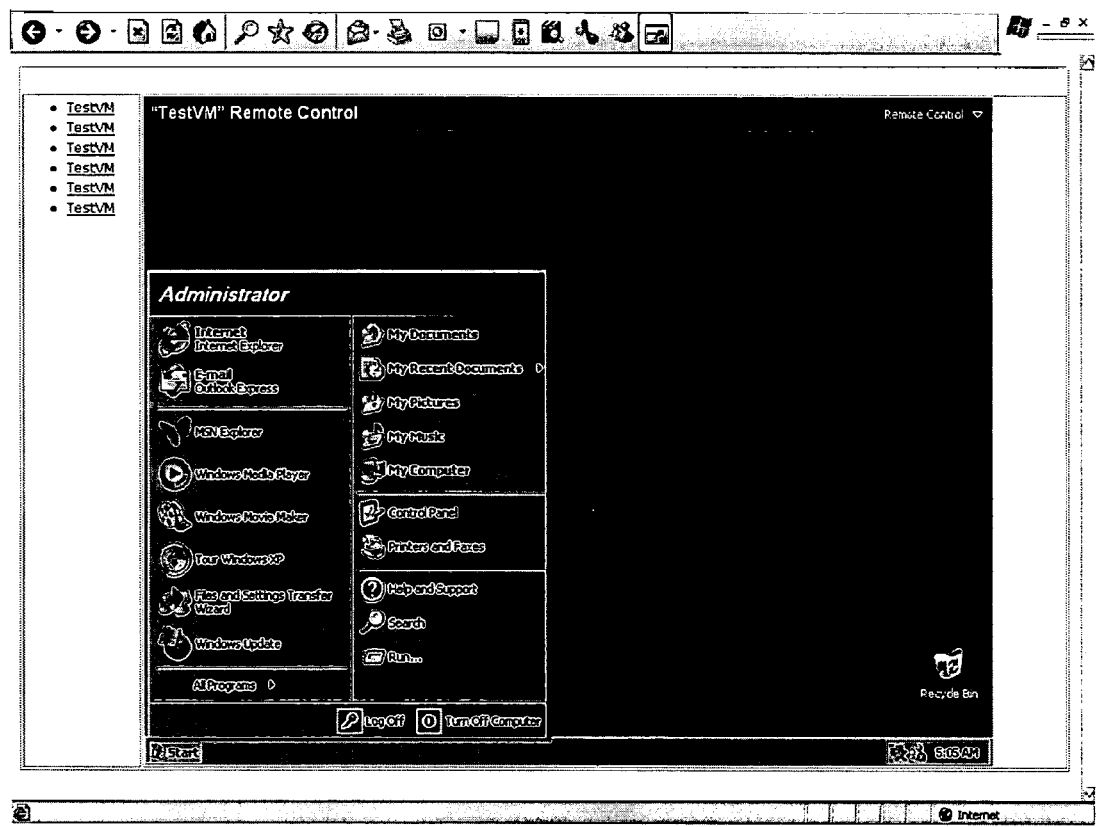
FIG. 18 is a screen shot of a cloned virtual machine within a browser.

Continuing to block 1506, the system 100 may search the MyvPC.local active directory 118 for an existing user based on the employee's login credentials, i.e., username and password. If the user exists in the active directory 118, control passes to block 1508, in which the employee is taken to an ActiveX page, which displays the employee's VM in its last known state. This process is illustrated in FIG. 18.

If, however, the user does not exist in the active directory 118 (e.g., a new employee), control passes to block 1510 in which the employee completes an employee profile form. The employee profile form may be similar to the new subscriber profile form 502 of FIG. 5. Alternatively, the employee profile form may have been completed previously, in which case information from the form may be accessed from a stored location.

Continuing to block 1512, the script 110 will create a new user object in the active directory 118 based on the employee's login credentials. Thereafter, in block 1514, the script 110 will add the new user object to a security group of the active directory 118, as well as to set a primary group for the new user object.

In block 1516, the script 110 will create a clone of a pre-defined (or user-selected) master VM 104. In one embodiment, this is accomplished using a batch file that copies a base image of the master VM 104, creating a new VM clone 108 uniquely renamed for the new employee based, for example, on the employee's login credentials.

The remainder of the process flow may occur essentially as outlined in the remainder of FIGS. 2A-2C. For example, the system 100 may selectively assign the VM clone 108 to the virtual server 102 best able to accommodate it. Additionally, the system 100 may boot the VM clone 108 within the selected virtual server 102, automatically logging in the VM clone 108 into an "administrator" account or the like in order to enable changing the computer name and/or adding the VM clone 108 to a particular corporate domain or workgroup.

The above-described process of hosting VM clones 108 results in many benefits to a corporation, not the least of which is eliminating the cost of providing a full-featured computer to each employee. In addition, using the principles discussed herein, the corporation may install updates, enforce security policies, and troubleshoot systems much more easily than the conventional model, in which the corporation purchases individual computers for employees.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

Embodiments of the invention may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments of the present invention may also be provided as a computer program product including a machine-readable medium having stored thereon instructions that may be used to program a computer (or other electronic device) to perform processes described herein. The machine-readable medium may include, but is not limited to, floppy diskettes, optical disks, CO-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

What is claimed is:

1. A system, comprising:
   a computing device comprising a processor and a memory,
   a virtual machine (VM) host server resident on the memory and operating on the processor to host a number of VMs, the VM host server including at least one master VM having a base image stored on a non-transitory non-volatile computer-readable storage medium, the base image comprising an operating system;
   a Web server resident on the memory and operating on the processor to authenticate a user by use of a user authentication credential in response to a request for online access to a new VM on the VM host server;
   a cloning module resident on the memory and operating on the processor, in communication with the Web server and the VM host server, to automatically clone a master VM to create a VM clone for the user on the VM host server responsive to the request, wherein the VM clone comprises a copy of the base image on the non-transitory non-volatile computer-readable storage medium, wherein the cloning module is configured to create the VM clone by copying the base image and renaming the copied image according to unique information pertaining to the user, and wherein the cloning module is further configured to check resources of a plurality of virtual servers to select a virtual server with adequate resources to host the VM clone, to assign the VM clone to the selected virtual server, and to boot the VM clone using an auto-login sequence into an administrator account, wherein, in response to the user being authenticated, the cloning module is further configured to determine whether the user has an existing VM clone by checking for a VM clone uniquely named according to the unique identifier assigned to the user, and in response to the user having an existing VM clone, provide the user with online access to the existing VM clone; and
   wherein the Web server comprises a common graphical user interface configured to, based on the user authentication, provide access to the cloning module for creating the VM clone for the user and to provide access to the deployed VM clone of the user by use of the user authentication credential, wherein the user authentication credential used to provide access to the deployed VM clone corresponds to the user authentication credential used to authenticate the user to the Web server.

2. The system of claim 1, wherein the unique information comprises identification information provided by the user.

3. The system of claim 1, wherein the unique information comprises one or more login credentials of the user.

4. The system of claim 1, wherein the Web server is configured to authenticate the user with a .NET Passport authentication system that returns a passport unique identifier in response to the user being successfully authenticated.

5. The system of claim 1, wherein the cloning module is further configured to create a new user object in an active directory according to the unique information pertaining to the user.

6. The system of claim 5, wherein the unique information comprises identification information provided by the user.

7. The system of claim 5, wherein the unique information comprises one or more login credentials of the user.

8. The system of claim 5, wherein the cloning module is further configured to add the new user object to a security group of the active directory as well as to set a primary group for the new user object.

9. The system of claim 1, wherein the cloning module is further configured to execute a script while the VM clone is logged into the administrator account to change a computer name associated with the VM clone.

10. The system of claim 1, wherein the cloning module is further configured to execute a script while the VM clone is logged into the administrator account to add the VM clone to a domain.

11. The system of claim 1, wherein the cloning module is further configured to execute a script while the VM clone is logged into the administrator account to add the VM clone to a workgroup.

12. The system of claim 1, wherein the cloning module includes a Lightweight Directory Access Protocol (LDAP) script, and wherein the cloning module uses the LDAP script to clone the master VM.

13. The system of claim 1, wherein the cloning module is further configured to prompt the user to select a master VM for cloning from a plurality of master VMs, each master VM being optimized for a different set of tasks.

14. A method, comprising:
   providing a common graphical user interface to provide access to a cloning module configured to create VM clones for a user and to provide online access to deployed VM clones of the user, wherein VM clones are created on a virtual server comprising a processor and memory, the virtual server including at least a master VM having a base image stored on a non-transitory storage, wherein the base image comprises an operating system, wherein creating a VM clone for the user comprises;
   authenticating the user by use of a user authentication credential in response to a request for online access to a new VM on the virtual server,
   associating the user with a unique user identifier in response to authenticating the user,
   checking resources of a plurality of virtual servers to select a virtual server from a plurality of virtual servers with adequate resources to host the VM clone of the user,
   automatically cloning a master VM to create a VM clone for the user on the virtual server responsive to the request by creating a copy of the base image for the VM clone on the non-transitory storage of the virtual server of the selected virtual server,
   renaming the copy of the base image on the VM host server according to the unique user identifier associated with the user, and
   booting the VM clone using an auto-login sequence into an administrator account, and
   wherein providing online access to the deployed VM clone of the user through the common graphical interface comprises;
   determining, in response to the user being authenticated, whether the user has an existing VM clone by checking for a VM clone uniquely named according to the unique user identifier associated with the user, and
   providing the user with online access to the existing VM clone in response to determining that the user has an existing VM clone, wherein the authentication credential used to access the deployed VM corresponds to the authentication credential used to authenticate the user to create the VM clone and displaying a list of VM clones created for the user including the deployed VM clone.

15. The method of claim 14, further comprising:
allocating virtual hardware resources to the VM clone hosted on the virtual server hosted on a physical host; and
upgrading the virtual hardware resources allocated to the VM clone in response to a request from the user.

16. The method of claim 15, further comprising reverting to the virtual hardware resources originally allocated to the VM clone after a pre-determined time.

17. The method of claim 14, wherein the user authentication credential comprises a .NET Passport authentication credential that returns a passport unique user identifier in response to the user being successfully authenticated.

18. The method of claim 14, further comprising creating a new user object in an active directory according to unique information pertaining to the user.

19. The method of claim 18, wherein the unique information comprises identification information provided by the user.

20. The method of claim 18, wherein the unique information comprises one or more login credentials of the user.

21. The method of claim 18, further comprising adding the new user object to a security group of the active directory.

22. The method of claim 14, wherein creating the VM clone for the user further comprises changing a computer name associated with the VM clone in accordance with the unique identifier associated with the user.

23. The method of claim 14, wherein creating the VM clone for the user further comprises adding the VM clone to one or more of a domain and a workgroup.

24. The method of claim 14, wherein creating the VM clone for the user further comprises executing a script while logged in to the administrator account, wherein executing the script comprises one or more of changing a computer name of the VM clone, adding the VM clone to a workgroup, and adding the VM clone to a domain.

25. The method of claim 14, wherein the authentication credential comprises an email address and password.

* * * * *